United States Patent
Wolodzko et al.

(10) Patent No.: US 11,728,043 B2
(45) Date of Patent: Aug. 15, 2023

(54) HIGH TEMPERATURE GAS-COOLED REACTOR CORE

(71) Applicant: U-Battery Limited, Buckinghamshire (GB)

(72) Inventors: Kornelia Wolodzko, Manchester (GB); Timothy James Abram, Manchester (GB)

(73) Assignee: U-BATTERY LIMITED, Buckinghamshire (GB)

( * ) Notice: Subject to any disclaimer, the term of this patent is extended or adjusted under 35 U.S.C. 154(b) by 63 days.

(21) Appl. No.: 17/336,162

(22) Filed: Jun. 1, 2021

(65) Prior Publication Data
US 2021/0375493 A1 Dec. 2, 2021

(30) Foreign Application Priority Data
Jun. 2, 2020 (GB) ..................................... 2008290

(51) Int. Cl.
G21C 3/04 (2006.01)
G21C 15/06 (2006.01)
G21C 3/28 (2006.01)

(52) U.S. Cl.
CPC .............. G21C 3/042 (2013.01); G21C 3/28 (2013.01); G21C 15/06 (2013.01)

(58) Field of Classification Search
CPC . G21C 3/28; G21C 3/042; G21C 5/14; G21C 15/06; G21C 5/12; G21C 5/126; G21C 5/16; G21C 5/18; G21C 1/12
See application file for complete search history.

(56) References Cited

U.S. PATENT DOCUMENTS

2009/0252278 A1* 10/2009 Bashkirtsev ............. G21C 3/58
376/412

FOREIGN PATENT DOCUMENTS

| CN | 109192333 A | | 1/2019 |
|----|-------------|---|--------|
| CN | 109545397 A | | 3/2019 |
| JP | 2019053085 A | | 4/2019 |
| KR | 101487713 B1 | * | 1/2015 |
| KR | 20190098611 A | * | 8/2019 |

OTHER PUBLICATIONS

Russell Vollman "HTGR Technology Course for the Nuclear Regulatory Commission" Idaho National Laboratory (Year: 2010).*
Ding, Ming, et al. "Design of a U-Battery." Delft Technical University, Delft, Tech. Rep (Year: 2011).*
(Continued)

*Primary Examiner* — Jack W Keith
*Assistant Examiner* — Joshua C Devorkin
(74) *Attorney, Agent, or Firm* — Armstrong Teasdale LLP

(57) ABSTRACT

The disclosure relates to a high temperature gas-cooled reactor core including a plurality of elongate fuel elements arranged in the form of a multi-lobed prism. Each prismatic fuel element includes an elongate prismatic body and a plurality of elongate fuel channels located within the prismatic body, wherein the cross-sectional area of each prismatic fuel element in a plane parallel to the bases of the prismatic fuel element is no more than 800 cm$^2$ and wherein a ratio of the height of the prismatic body to its greatest width is greater than or equal to 3.0.

14 Claims, 4 Drawing Sheets

(56) References Cited

OTHER PUBLICATIONS

Great Britain Search and Examination Report, Application No. 2008290.5, dated Nov. 18, 2020, 8 pps.
Great Britain Search and Examination Report, Application No. 2107727.6, dated Oct. 15, 2021, 8 pps.
Yasuda et al., "Construction of VHTRC (Very High Temperature Reactor Critical Assembly)", JAERI-1305, Nov. 26, 2986, 144 pps., https://inis.iaea.org/search/search.aspx7orig_q-RN:19046498.
F. Bostelmann and G. Strydom, "Nuclear data uncertainty and sensitivity analysis of the VHTRC benchmark using SCALE", Annals of Nuclear Energy, vol. 110, 2017, pp. 317-329, https://doi.org/10.1016/j.anucene.2017.06.052.
N. Fujimoto et al., "Validation of the nuclear design code system for the HTTR using the criticality assembly VHTRC", Nuclear Engineering and Design, vol. 233, 2004, pp. 155-162, https://doi.org/10.1016/j nucengdes.2004.08.005.
International Atomic Energy Agency, High Temperature Gas Cooled Reactor Fuels and Materials, IAEA-TECDOC-CD-1645, IAEA, Vienna, Mar. 2010, 1 page, https://www.iaea.org/publications/8270/high-temperature-gas-cooled-reactor-fuels-and-materials.

\* cited by examiner

HIGH TEMPERATURE GAS-COOLED REACTOR CORE

CROSS REFERENCE TO RELATED APPLICATIONS

This patent application claims the benefit and priority of Great Britain Patent Application No. 2008290.5 filed on Jun. 2, 2020, the disclosure of which is incorporated by reference herein in its entirety as part of the present application.

BACKGROUND

The present disclosure relates to a high temperature gas-cooled reactor core. The disclosure also relates to fuel elements and fuel element arrangements for high temperature gas-cooled reactors (HTGRs).

HTGRs were first developed in the frame of a project initiated by the Organisation for Economic Co-operation and Development (OECD) in the 1960s that resulted in the design, construction, and operation of the Dragon reactor, the world's first HTGR. During the Dragon project, a new type of nuclear fuel was developed known as Coated Particle Fuel. This fuel includes very small spheres of fissile material, typically 350-750 microns in diameter, coated with ceramic layers composed of carbon and silicon carbide to produce a fuel particle with a diameter of around 1 mm. These coated particles are then mixed with graphite powder and pressed into cylindrical pellets, known as compacts. The geometry of the compacts is not critical, but they are typically around 12.5 mm in diameter and 51 mm long.

The compacts are incorporated into graphite fuel elements, typically of hexagonal cross-section, with an across-the-flats dimension of around 36 cm and a length of around 80 cm for example. The fuel elements contain cylindrical channels for accommodating a column of fuel compacts. In some designs, the fuel compacts are accommodated in one set of channels, and helium cooling gas flows in a separate set of cooling channels. In other designs, only one set of channels is provided such that the cooling helium gas flows along the same channel as the compacts (the channels or the compacts being provided with ribs to centre the compacts within the channels and to promote heat transfer).

The reactor core is formed of a large number of fuel elements stacked one on-top of another to form columns, and arranged together to form a core shape that is broadly cylindrical; often a solid cylinder, although some designs include a central column composed not of fuel elements but of identically sized graphite blocks. In all designs, outside of the cylindrical core the fuel elements are surrounded by other identically-sized graphite blocks. The purpose of these graphite blocks is to act as a "moderator", which is an essential part of HTGRs. A moderator is a material that absorbs energy from neutrons through a series of collisions, but which does not absorb the neutrons. The resulting low energy neutrons have a much greater probability of producing more fission events in the nuclear fuel.

FIG. 1A shows a schematic plan view of a prior art fuel element 10 for a HTGR core. As best shown in FIG. 1B, the fuel element 10 includes an elongate prismatic body 20 having opposing parallel bases 21 located at either end of the prismatic body 20, and six sidewalls 22 extending between the bases 21. The cross-section of the prismatic body 20 in a plane parallel to the bases 21 is a regular hexagon. The hexagonal cross-section has an across-the-flats dimension of about 36 cm such that the surface area of the cross-section is about 1122 cm². The elongate prismatic body 20 has a length (distance between the bases 21) of about 80 cm such that it is taller than it is wide.

The prismatic body 20 includes a graphite material within which are located a plurality of fuel channels 23. The fuel channels 23 each house a column, or stack, of fuel compacts. In this prior art example, the fuel element 10 includes 210 fuel channels 23.

A plurality of cooling channels 24, 25 are also located in the prismatic body 20 interspersed among the fuel channels 23 in a regular pattern. The cooling channels 24, 25 are arranged to carry helium cooling gas in use to cool the fuel element 10. The fuel element 10 has 108 cooling channels 24, 25 including 102 large diameter cooling channels 24, and 6 smaller diameter cooling channels 25. The smaller diameter cooling channels 25 are located in an approximate ring shape around a central portion 26 of the fuel element 10. The central portion 26 includes no fuel channels 23 or cooling channels 24, 25 and is recessed below the top surface 21 of the fuel element 10 to provide an engagement point for a fuel handling machine.

The prior art fuel element 10 also includes 6 burnable poison channels 27 located within the prismatic body 20 at each apex of the hexagonal cross-section of the prismatic body 20.

The fuel channels 23 have a diameter of about 1.3 cm, the cross-sectional area of each fuel channel 23 is therefore about 1.33 cm², and the total cross-sectional area of all 210 fuel channels 23 for the fuel element 10 is about 279 cm². The fuel channels 23 therefore occupy about 24.9% of the cross-sectional area of the fuel element 10.

FIG. 2 shows a schematic plan view of a prior art HTGR core 50. The core 50 includes six columns 51 of prior art fuel elements 10 arranged in a generally annular configuration. Each column 51 of prior art fuel elements 10 includes a plurality of prior art fuel elements 10 stacked one on-top of another. The annulus of fuel element columns 51 surrounds a graphite moderator material column 52, and is surrounded by an annulus 53 of graphite moderator material columns 54. In this prior art example, the moderator material columns 52, 54 include stacks of identically sized graphite blocks of hexagonal cross-section. The annulus 53 of graphite moderator material columns 54 is itself surrounded by a solid graphite frame 55 which also acts as a moderator.

The above described prior art fuel element 10 and reactor core 50 are examples only and variations to the design of prior art fuel elements and reactor cores exist. However, the dimensions and arrangements described above are typical of HTGR in the art. For the avoidance of doubt, it is stated here that this disclosure relates to the field of HTGRs, as opposed to fast neutron reactors, for which the average neutron energy and core power density is significantly higher compared to HTGRs. A significant difference between fast neutron reactors and HTGRs is that fast neutron reactors do not require the use of neutron moderators and, indeed, the use of moderator in fast neutron reactors is undesirable. In contrast there is a drive to include high moderator content in HTGRs where the resulting low energy neutrons have a much greater probability of producing more fission events in the nuclear fuel.

It has been known for a long time in the field of HTGR design and operation that the existing fuel element and reactor core designs are slightly under moderated such that the fuel usage is not as efficient as it might be. It is against this background that the present disclosure has been developed.

BRIEF DESCRIPTION

A first aspect of the present disclosure provides a high temperature gas-cooled reactor core including a plurality of elongate fuel elements arranged in the form of a multi-lobed prism.

By way of example, each prismatic fuel element includes an elongate prismatic body and a plurality of elongate fuel channels located within the prismatic body, wherein the cross-sectional area of each prismatic fuel element in a plane parallel to the bases of the prismatic fuel element is no more than 800 cm$^2$. Furthermore, a ratio of the height of the prismatic body to its greatest width may be greater than or equal to 3.0.

Typically, the ratio of the height of the prismatic body to its greatest width is greater than or equal to 3.2. For example, typically the ratio of the prismatic body's height to its greatest width is between 3.2 and 3.3, and typically between 3.2 and 3.25. In prior art HTGRs, the prismatic body's height to its greatest width is typically only about 2.2 and so the fuel elements are a quite different shape (relatively tall and thin compared to relatively short and wide).

Reference to "multi-lobed" is intended to mean that the fuel elements define an arrangement of multiple projections, each of rounded or curved form. The arrangement is contiguous so that the lobes share a common border with each other. An example of a multi-lobed configuration is a three-leaf or four-leaf clover arrangement.

The use of a multi-lobed configuration allows for a greater number of design options in the arrangement of the fuel elements within the reactor core, in particular with respect to the ratio of moderator material to fuel elements. Because in the disclosure the fuel elements are tall and thin (the cross-sectional area of each prismatic fuel element in a plane parallel to the bases of the prismatic fuel element is no more than 800 cm$^2$ and the ratio of the height of the prismatic body to its greatest width is greater than or equal to 3.0), the arrangement of the fuel elements into a multi-lobed prism arrangement is particularly convenient and can be accommodated readily. The plurality of elongate fuel elements may be arranged in the form of a three-lobed prism.

As the plurality of elongate fuel elements may be arranged in the form of a multi-lobed annular prism, this allows moderator material to be located in a central region of the reactor core. Importantly, the multi-lobed configuration, and especially when there are only a low number of lobes, allows an increase in the graphite material which can be located within the core. In a high temperature gas-cooled reactor, the use of moderator material is important and so a configuration of fuel elements which allows greater accommodation space for the moderator material is highly advantageous.

The high temperature gas-cooled reactor core may include a central trunk of moderator material surrounded by the multi-lobed annular prism of elongate fuel elements.

The central trunk of moderator material may include a plurality of columns of moderator material arranged together to form a solid prismatic body.

A second aspect of the disclosure provides an elongate prismatic fuel element for a high temperature gas-cooled reactor, the prismatic fuel element including an elongate prismatic body and a plurality of elongate fuel channels located within the prismatic body, wherein the cross-sectional area of the prismatic fuel element in a plane parallel to the bases of the prismatic fuel element is no more than 800 cm$^2$.

By way of example, the cross-sectional area of the prismatic fuel element in a plane parallel to the bases of the prismatic fuel element may be between 500 cm$^2$ and 800 cm$^2$, and typically may be between 600 cm$^2$ and 700 cm$^2$. By way of further example, the cross-sectional area of the prismatic fuel element in a plane parallel to the bases of the prismatic fuel element may be between 650 cm$^2$ and 675 cm$^2$. Typically, the cross-sectional area of the prismatic fuel element, in a plane parallel to the bases of the prismatic fuel element, is no more than 675 cm$^2$.

The fuel element of the present disclosure is advantageous because it facilitates a more complex reactor core geometry to be constructed within more limited space compared to the prior art. This in turn allows for more efficient placement and arrangement of moderator material within the core structure. In addition, the weight of the fuel element may be reduced which in turn reduces the lifting capability required for the fuel handling machine thereby reducing cost and complexity.

In another embodiment the present disclosure provides an elongate prismatic fuel element for a high temperature gas-cooled reactor, the prismatic fuel element including an elongate prismatic body and a plurality of elongate fuel channels located within the prismatic body, wherein the ratio of the prismatic body's height to its greatest width is greater than or equal to 3.0, and typically greater than or equal to 3.2. For example, typically the ratio of the prismatic body's height to its greatest width is between 3.2 and 3.3, and typically between 3.2 and 3.25. In the prior art, the prismatic body's height to its greatest width is typically only about 2.2.

As above, this fuel element is advantageous as it facilitates a more complex reactor core geometry to be constructed within a limited space. This in turn allows for more efficient placement and arrangement of moderator material. In addition, the weight of the fuel element may be reduced which in turn reduces the lifting capability required for the fuel handling machine thereby reducing cost and complexity.

The total cross-sectional area of the fuel channels in a plane parallel to the bases of the prismatic fuel element may be no more than 24% of the cross-sectional area of the prismatic fuel element. This places an upper limit on the number of fuel compacts that can be housed within the fuel element thereby helping to increase the ratio of moderator material to fuel within the fuel element.

In some embodiments, the total cross-sectional area of the fuel channels in a plane parallel to the bases of the prismatic fuel element may be between 22% and 24% of the cross-sectional area of the prismatic fuel element.

Typically, for example, the total cross-sectional area of the fuel channels in a plane parallel to the bases of the prismatic fuel element may be approximately 23% of the cross-sectional area of the prismatic fuel element.

A plurality of elongate cooling channels may be located in the prismatic body to provide an arrangement having dedicated cooling channels which are separate to the fuel channels.

The prismatic fuel element may have a hexagonal cross-section.

In a further aspect, the present disclosure provides a high temperature gas-cooled reactor core as described above including a plurality of elongate prismatic fuel elements as described above.

The reduced size of the fuel elements allow the fuel elements to be arranged conveniently in the multi-lobe configuration and, hence, the two aspects of the disclosure together have a particular synergy. For example, the multi-lobe configuration of the fuel elements may resemble that of a three-leafed clover.

It will be appreciated that example features of the first or second aspect of the disclosure may be incorporated in any of the other aspects of the disclosure, alone or in appropriate combination.

BRIEF DESCRIPTION OF THE DRAWINGS

The present disclosure will now be described by way of non-limiting examples with reference to the following figures, in which.

DETAILED DESCRIPTION

Figure 3B:
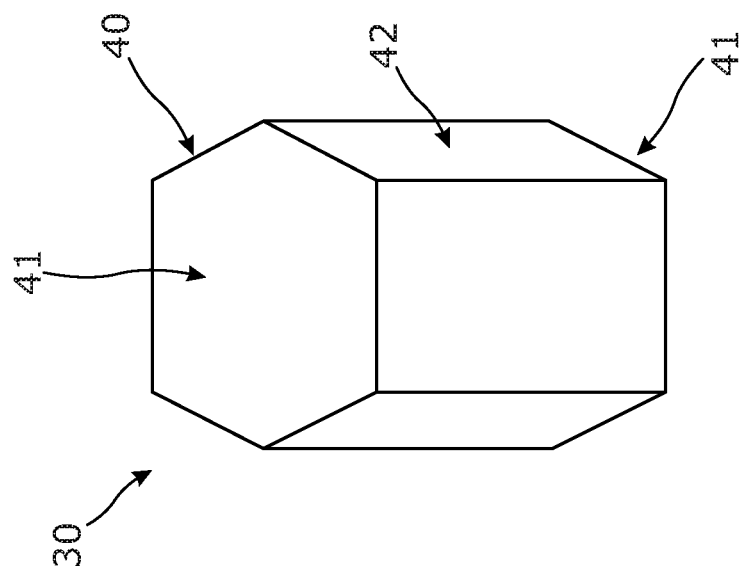
FIG. 3B shows a schematic isometric view of a fuel element according to the present disclosure.
Figure 3A:
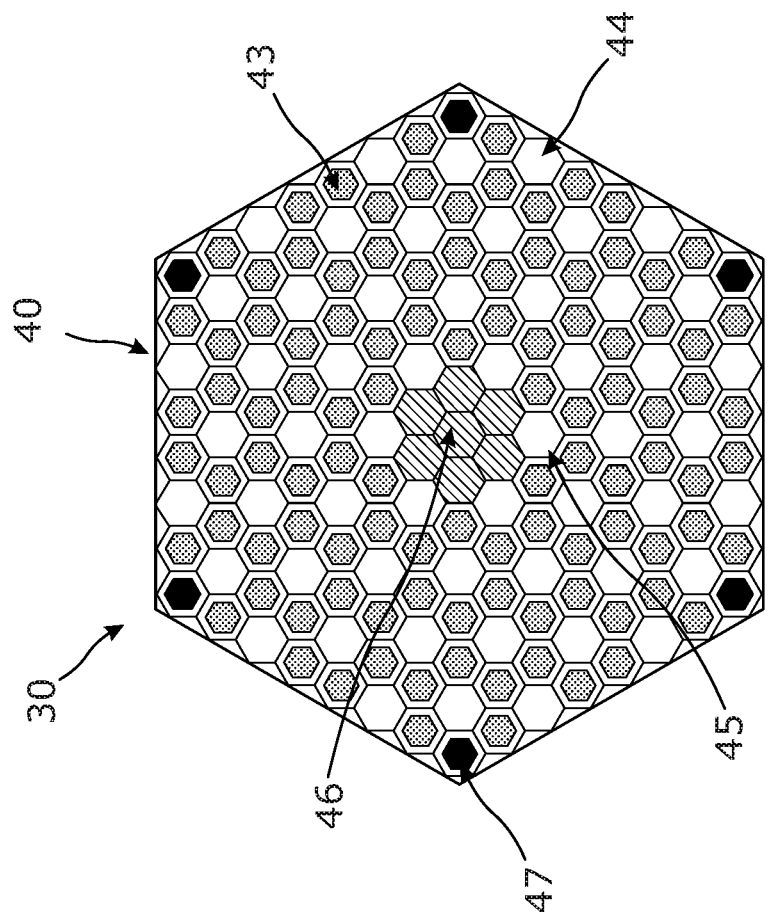
FIG. 3A shows a schematic plan view of a fuel element according to the present disclosure.

FIGS. 3A and 3B show a new design of fuel element 30. The fuel element 30 includes an elongate prismatic body 40 having opposing parallel bases 41 at either end of the prismatic body 40 and six sidewalls 42 extending between the bases 41. The cross-section of the prismatic body 40 in a plane parallel to the bases 41 is a regular hexagon. In one embodiment, the hexagonal cross-section of the prismatic body has an across-the-flats dimension of about 25.9 cm such that the surface area of the cross-section is about 581 $cm^2$, but this is only an example. Typically, in embodiments of the disclosure, the cross-sectional area of the prismatic fuel element in a plane parallel to the bases of the prismatic fuel element may be within the range of between 500 $cm^2$ and 800 $cm^2$, and is no more than 675 $cm^2$.

The elongate prismatic body 40 has a length (distance between the bases 41) of about 80 cm such that it is taller than it is wide. With a height of about 80 cm and an across-the-flats width of 25.9 cm, the ratio of the prismatic body's height to its greatest across-the-flats width is approximately 3.09. Typically, for example, embodiments of the disclosure include a prismatic body with a ratio of the height of the prismatic body 40 to its greatest width (across-the-flats) of at least 3.0.

Notably, the cross-section of the fuel element 30 of the disclosure is just over half the size (around 52%) of the cross-section of the prior art fuel element 10, and so is much more compact.

The prismatic body 40 includes a graphite material within which are located a plurality of fuel channels 43. The fuel channels 43 each house a column, or stack, of fuel compacts. In this example, the fuel element 30 includes 102 fuel channels 43.

Figure 1B:
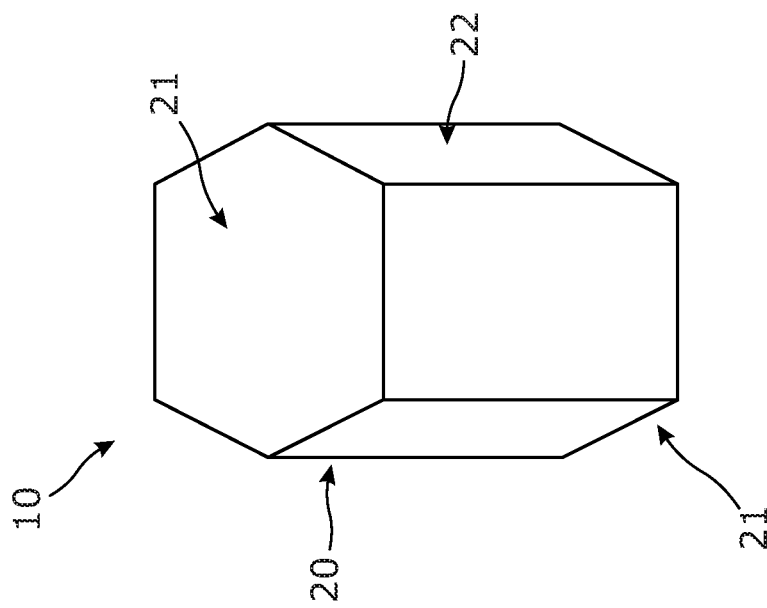
FIG. 1B shows a schematic isometric view of a prior art fuel element.
Figure 1A:
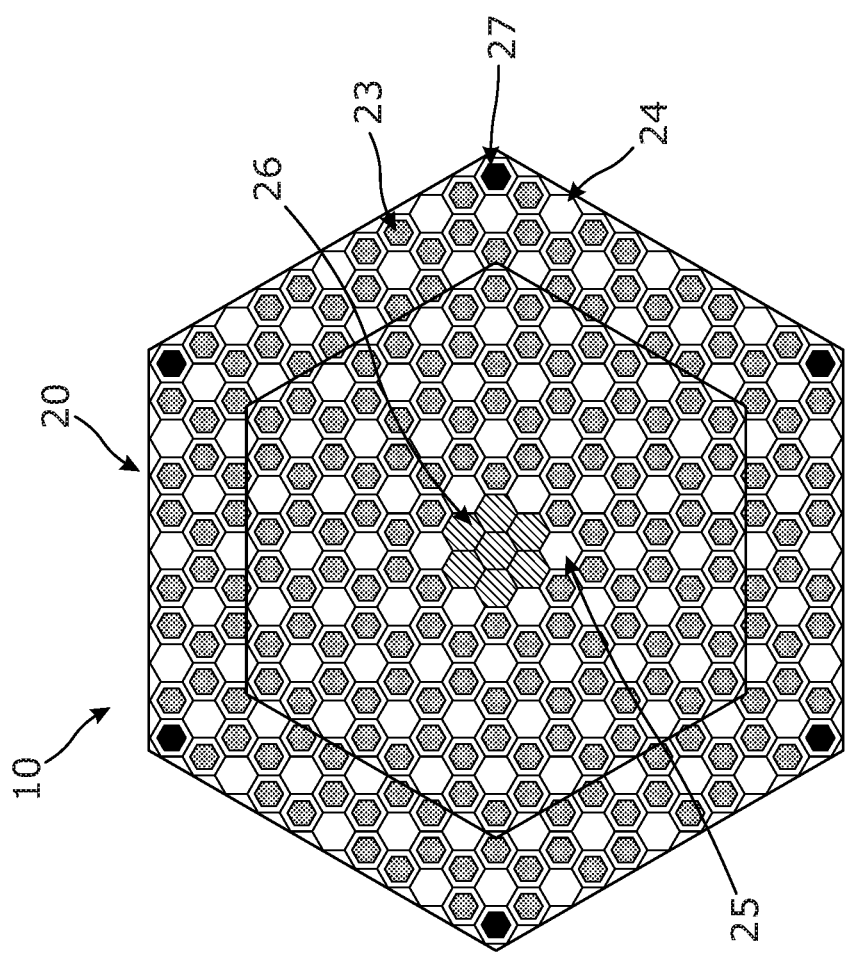
FIG. 1A shows a schematic plan view of a prior art fuel element.
Figure 2:
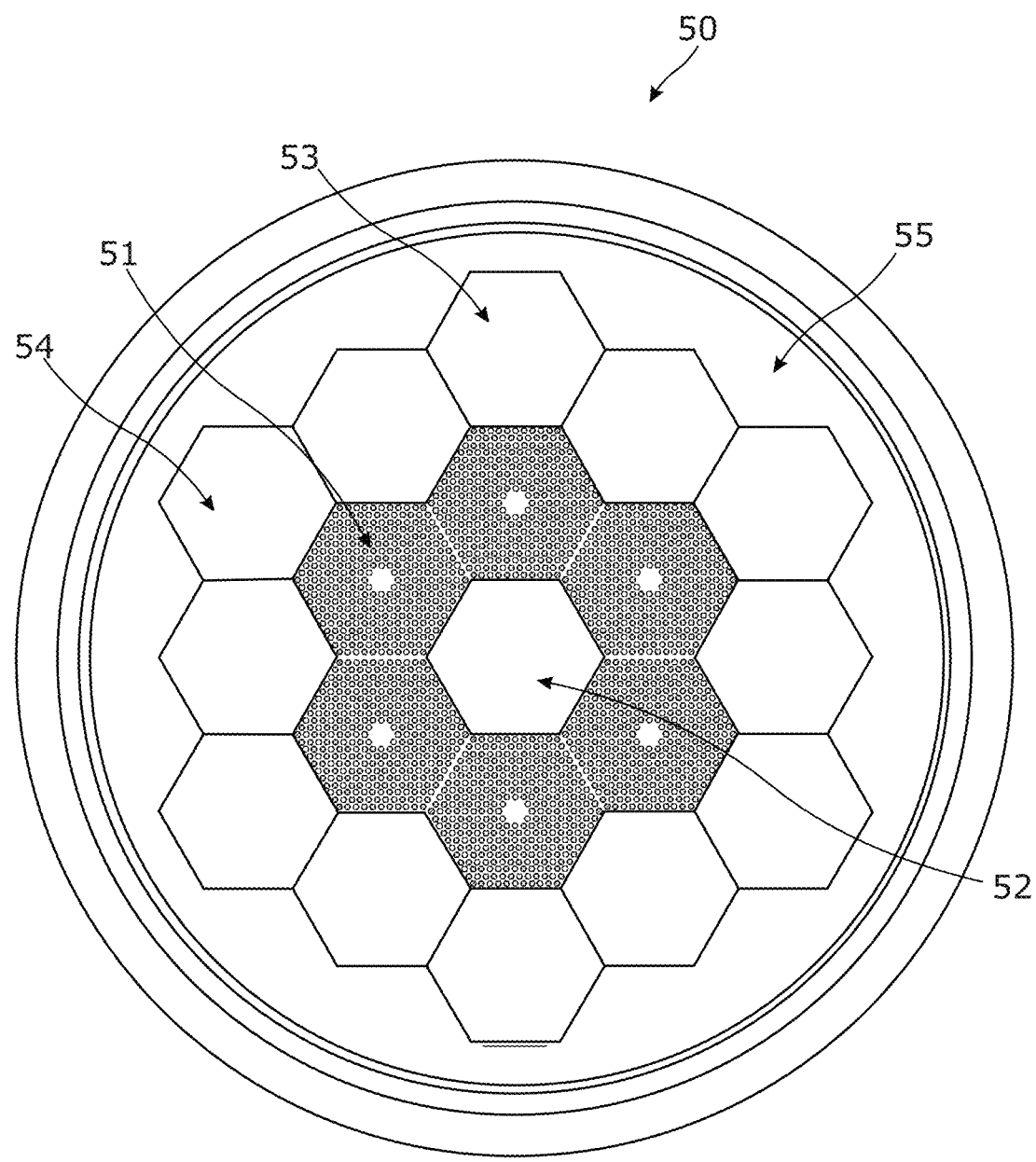
FIG. 2 shows a schematic plan view of a prior art HTGR core.

A plurality of cooling channels 44, 45 are also located within the prismatic body 40 interspersed among the fuel channels 43 in a regular pattern. In this example, the fuel element 30 has 54 cooling channels 44, 45 including 48 large diameter cooling channels 44, and 6 small diameter cooling channels 45. The small diameter cooling channels 45 are located in an approximate annular arrangement around a central portion 46 of the fuel element 30. As in the prior art example of FIG. 1A, the central portion 46 includes no fuel channels 43 or cooling channels 44, 45 and is recessed below the top surface 41 of the fuel element 30 to provide an engagement point for a fuel handling machine.

In this example, the fuel element 30 also includes 6 burnable poison channels 47, each of which is located within the prismatic body 40 at each apex of the hexagonal cross-section of the prismatic body 40.

The fuel channels 43 have a diameter of about 1.3 cm and the cross-sectional area of each fuel channel 43 is therefore about 1.33 $cm^2$. The total cross-sectional area of all 102 fuel channels 43 together is therefore about 135 $cm^2$ so that the fuel channels 43 occupy approximately 23% (about 23.2%) of the total cross-sectional area (around 580 $cm^2$) of the fuel element 30. In other embodiments, the total cross-sectional area of all the fuel channels may be slightly larger, but is typically no more than 24% of the total cross-sectional area of the fuel element 30.

Figure 4:
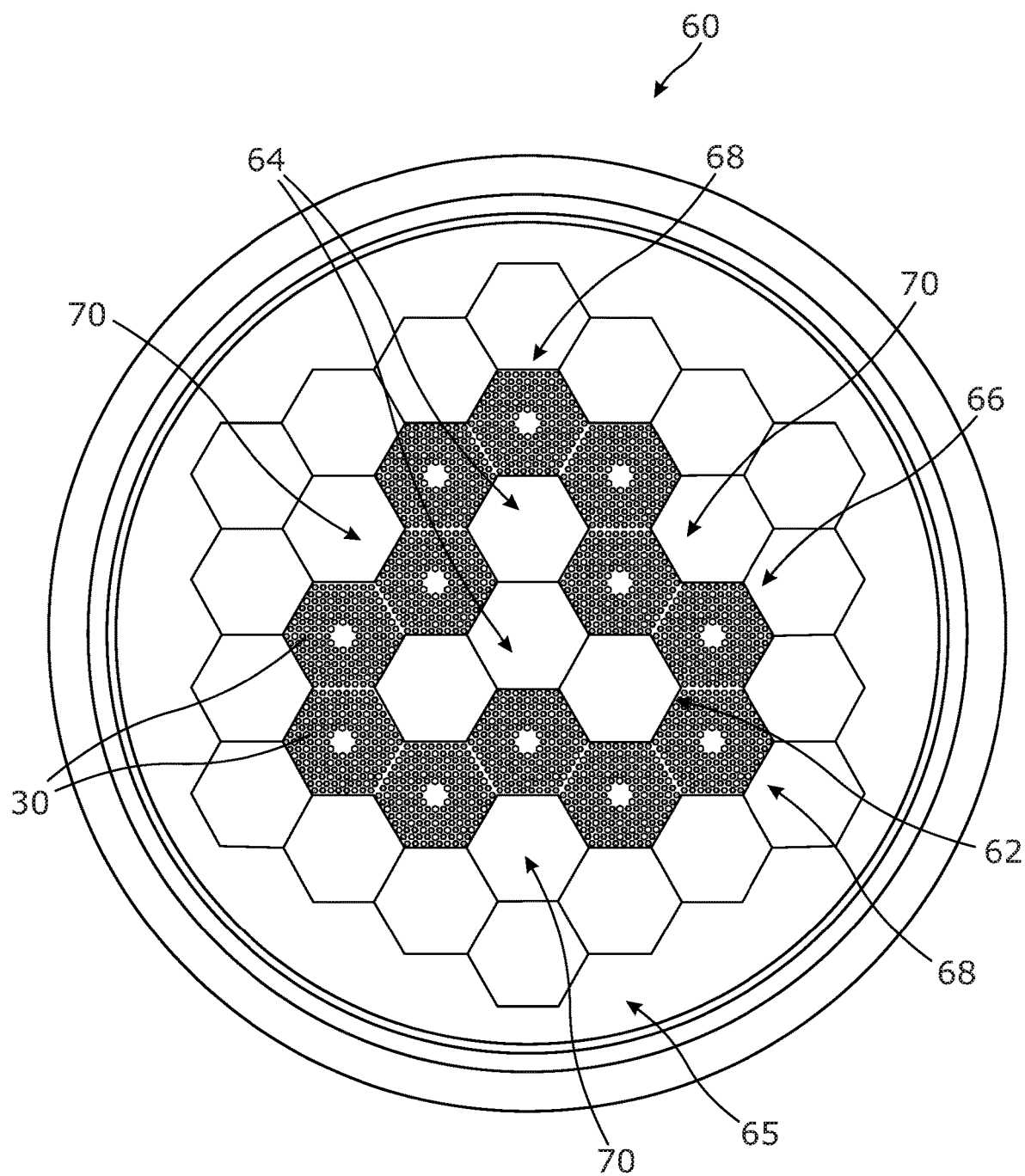
FIG. 4 shows a schematic plan view of a HTGR core according to the present disclosure.

FIG. 4 shows a schematic plan view of a new HTGR core arrangement 60. The core 60 includes twelve columns 61 of fuel elements 30 (two of which are identified) arranged in a multi-lobed configuration to form a multi-lobed prismatic body 66. The multi-lobed prismatic body 66 is a contiguous arrangement of lobes (i.e. projections, relative to a central axis, of curved form) which arranged to define an annulus. The shape resembles that of a three-leaf clover, or may be considered to be a "serpentine" arrangement. In the example of FIG. 4, the arrangement has three lobes (two of which are identified generally, at 68) which are arranged to define a contiguous and broadly annular configuration. Each lobe defines a projection, of curved form, and each lobe projects radially beyond an adjacent recessed region 70 of the contiguous border. One recessed region 70 separates adjacent lobes 68.

Each column 61 of fuel elements 30 includes a plurality of fuel elements 30 stacked one on-top of another. By virtue of the smaller size of the fuel elements 30, as discussed above with reference to FIGS. 3A and 3B, it is possible to arrange the elements in such a multi-lobed configuration. Using fuel elements of larger size, as in the prior art, is not compatible with this type of beneficial multi-lobed configuration which in the disclosure permits an increased proportion of graphite moderator material to be used. This is especially important in HTGRs where the use of moderator material is critical to the functioning of the reactor.

The prismatic body 66 surrounds a central trunk 62 of graphite moderator material. The central trunk 62 of moderator material itself includes four graphite moderator material columns 64 (only two of which are identified with reference numbers) arranged together to form a solid prismatic body. The moderator material columns 64 each include stacks of identically sized graphite blocks of hexagonal cross-section. The graphite moderator material columns 64 and the annulus of fuel elements 30 are surrounded by a solid graphite frame 65 which also acts as a moderator in use.

It will be appreciated that the aforementioned dimensions are given by way of example only and other dimensions are possible without departing from the scope of the disclosure as defined by the features of the accompanying claim set.

What is claimed is:

1. A high temperature gas-cooled reactor core comprising a plurality of elongate prismatic fuel elements, each fuel element having a hexagonal cross-section in a plane parallel to bases of each respective prismatic fuel element, the plurality of fuel elements being formed in a contiguous arrangement of lobes to define an annulus of fuel elements which share a common contiguous border with one another, wherein each lobe is defined by multiple fuel elements and each lobe forms a projection which projects radially beyond an adjacent recessed region of the contiguous border, with one recessed region separating adjacent projections, and wherein each prismatic fuel element comprises an elongate prismatic body and a plurality of elongate fuel channels located within each prismatic body together with a plurality of cooling channels interspersed among the fuel channels, wherein a cross-sectional area of each prismatic fuel element in the plane parallel to the bases of the respective prismatic fuel element is no more than 800 cm$^2$, and wherein a ratio of a height of each prismatic body to its greatest across-the-flats width is greater than or equal to 3.0, and wherein the annulus of fuel elements surrounds a central trunk of moderator material comprising a plurality of columns of moderator material.

2. The high temperature gas-cooled reactor core according to claim 1, wherein the ratio of the respective prismatic body's height to its greatest across-the-flats width is greater than or equal to 3.2.

3. The high temperature gas-cooled reactor core according to claim 1, wherein the plurality of elongate fuel elements are arranged in an annulus having three lobes.

4. The high temperature gas-cooled reactor core according to claim 1, wherein the plurality of columns of moderator material are arranged together to form a solid prismatic body.

5. The high temperature gas-cooled reactor core according to claim 1, wherein the cross-sectional area of each prismatic fuel element in the plane parallel to the bases of the respective prismatic fuel element is between 500 cm$^2$ and 800 cm$^2$.

6. The high temperature gas-cooled reactor core according to claim 5, wherein the cross-sectional area of each prismatic fuel element in the plane parallel to the bases of the respective prismatic fuel element is between 600 cm$^2$ and 700 cm$^2$.

7. The high temperature gas-cooled reactor core according to claim 6, wherein the cross-sectional area of each prismatic fuel element in the plane parallel to the bases of the respective prismatic fuel element is between 650 cm$^2$ and 675 cm$^2$.

8. The high temperature gas-cooled reactor core according to claim 1, wherein a total cross-sectional area of the fuel channels in the plane parallel to the bases of the respective prismatic fuel element is no more than 24% of the cross-sectional area of the respective prismatic fuel element in the plane parallel to the bases of the respective prismatic fuel element.

9. The high temperature gas-cooled reactor core according to claim 8, wherein the total cross-sectional area of the fuel channels in the plane parallel to the bases of the respective prismatic fuel element is between 22% and 24% of the cross-sectional area of the respective prismatic fuel element in the plane parallel to the bases of the respective prismatic fuel element.

10. The high temperature gas-cooled reactor core according to claim 8, wherein the total cross-sectional area of the fuel channels in the plane parallel to the bases of the respective prismatic fuel element is approximately 23% of the cross-sectional area of the respective prismatic fuel element in the plane parallel to the bases of the respective prismatic fuel element.

11. The high temperature gas-cooled reactor core according to claim 1, further comprising a plurality of elongate cooling channels located in each prismatic body.

12. An elongate prismatic fuel element for a high temperature gas-cooled reactor as claimed in claim 1, the prismatic fuel element comprising an elongate prismatic body and a plurality of elongate fuel channels located within the prismatic body, wherein a ratio of the prismatic body's height to its greatest across-the-flats width is greater than or equal to 3.0, and wherein a cross-sectional area of each prismatic fuel element in a plane parallel to bases of the prismatic fuel element is no more than 800 cm$^2$.

13. The elongate prismatic fuel element according to claim 12, wherein the ratio of the prismatic body's height to its greatest across-the-flats width is greater than or equal to 3.2.

14. The high temperature gas-cooled reactor core according to claim 1, wherein some of the plurality of fuel elements in the annulus of fuel elements are located radially outward of others of the plurality of fuel elements in the annulus of fuel elements.

* * * * *